UNITED STATES PATENT OFFICE.

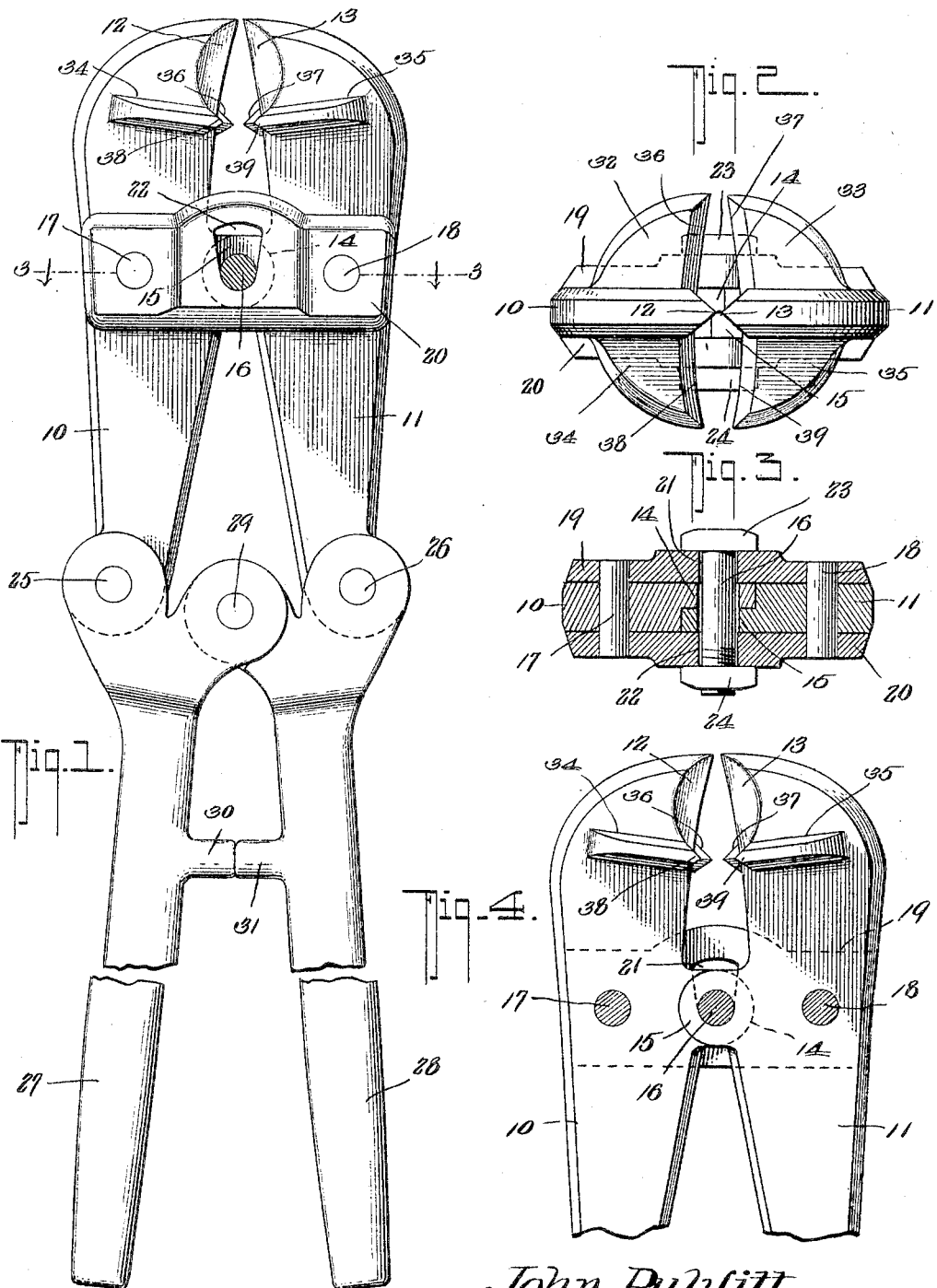

JOHN PULVITT, OF ALVARADO, TEXAS.

NUT-CLIPPER.

No. 802,595.  Specification of Letters Patent.  Patented Oct. 24, 1905.

Application filed May 12, 1905. Serial No. 260,147.

*To all whom it may concern:*

Be it known that I, JOHN PULVITT, a citizen of the United States, residing at Alvarado, in the county of Johnson and State of Texas, have invented a new and useful Nut-Clipper, of which the following is a specification.

This invention relates to implements for clipping nuts from bolts and for like purposes, and has for its object to improve the construction and increase the efficiency of devices of this character.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form or embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a side view, and Fig. 2 is a plan view, of the improved implement. Fig. 3 is a transverse section on the line 3 3 of Fig 1. Fig. 4 is a side elevation of the upper portion of the implement with one of the side guards detached.

The improved implement comprises two oppositely-disposed jaw members 10 11, having V-shaped cutting edges 12 13 diverging away from the terminals and with overlapping ears 14 15 intermediately of the jaw members and movably united by a pivot 16. Secured transversely of the jaw members 10 11, as by pivots 17 18, are side plates 19 20, having longitudinally-extending slots 21 22, through which the extended ends of the pivot member 16 project, as shown, the pivot member having a head 23 on one side and a nut 24 on the other side, as shown in Fig. 3. At their inner ends the jaw members are coupled, as by pivots 25 26, to handles 27 28, the latter pivotally united, as at 29. It will here be explained that as the jaws 10 and 11 swing upon the pivots 17 and 18, which are rigidly spaced by the plates 19 and 20, the openings in the ears 14 and 15 should be of a size to permit of the necessary lateral play of the pivot-pin 16, so as to prevent binding of the jaws upon said pivot-pin. The handles are also provided with stops 30 31 to limit the inward movement of the jaw members, as hereinafter explained. Extending from the side faces of the jaw members 10 11 are lugs 32 33 34 35, the lugs 32 33 having reversely-disposed V-shaped cutting edges 36 37 and the lugs 34 35 having similar cutting edges 38 39, the cutting edges of the lugs diverging toward the center of the implement in the same manner as the cutting edges 12 13 of the main jaw members are caused to diverge. The "root" portions of the cutting edges are thus all farther apart than their terminals, as shown.

It will be noted that the distance between the terminals of the several pairs of cutting edges vary, so that the implement is adapted for use on nuts of various sizes.

With an implement thus constructed it is obvious that when the handles 27 28 are separated the jaw members will be correspondingly separated, and then when any of the pairs of cutting edges are placed upon opposite sides of any object and the handles forcibly compressed a very strong leverage action will be exerted upon the object thus embraced, with the result of severing the same.

The implement may be used for severing various objects, but is designed more particularly for splitting nuts from bolts which have become so badly rusted as to be useless or irremovable otherwise. Nuts in this condition are usually partially embedded in the structure to which their bolts are attached and cannot be reached by ordinary pliers or clippers, but require a special form of cutting-jaw, such as shown in the accompanying drawings. The varying width of the several sets of cutters enables the implement to be employed upon various sizes of nuts, while the diverging arrangement of the cutting edges enables the nuts to be severed without injury to the bolts. Thus when the rusting has not penetrated to the bolts the latter will not be injured, as the jaws bear only on the nuts.

When the jaw members are actuated, it will be noted that the strains are distributed between the ears 14 15 and side plates 19 20, the slots 21 22 permitting the necessary "play" longitudinally of the jaws, while at the same time effectually preventing any lateral movement. A very strong and durable joint is thus formed between the jaw members which is not dependent wholly upon either the central bolt or the side member bolts 17 18, so that in event of the breakage of either the implement would still be in operative condition.

Having thus described the invention, what I claim is—

1. In an implement of the class described, two reversely-disposed jaw members having oppositely-disposed cutting edges and with overlapping ears extending intermediately therefrom and united by a pivot member having extended ends, side plates connected to said jaw members having slots bearing over the extended ends of said pivot member, and means for actuating said jaw members.

2. In an implement of the class described, two reversely-disposed jaw members having oppositely-disposed cutting edges in V shape and diverging away from their terminals, and with overlapping ears extending intermediately therefrom and united by a pivot member having extended ends, side plates pivoted to said jaw members having slots bearing over the extended ends of said pivot member, and means for actuating said jaw members.

In testimony that I claim the foregoing as my own I have hereto affixed my signature in the presence of two witnesses.

JOHN PULVITT.

Witnesses:
C. A. SHULTZ,
E. M. JOINER.